(12) United States Patent
Aso

(10) Patent No.: US 11,668,816 B2
(45) Date of Patent: Jun. 6, 2023

(54) INSTALLATION STRUCTURE FOR VICINITY INFORMATION DETECTION SENSOR

(71) Applicant: TOYOTA JIDOSHA KABUSHIKI KAISHA, Aichi-ken (JP)

(72) Inventor: Shuichi Aso, Toyota (JP)

(73) Assignee: TOYOTA JIDOSHA KABUSHIKI KAISHA, Aichi-ken (JP)

( * ) Notice: Subject to any disclaimer, the term of this patent is extended or adjusted under 35 U.S.C. 154(b) by 611 days.

(21) Appl. No.: 16/509,497

(22) Filed: Jul. 12, 2019

(65) Prior Publication Data
US 2020/0072964 A1 Mar. 5, 2020

(30) Foreign Application Priority Data
Aug. 28, 2018 (JP) .............................. JP2018-159175

(51) Int. Cl.
| | |
|---|---|
| *G01S 13/931* | (2020.01) |
| *B60J 5/04* | (2006.01) |
| *G01S 7/03* | (2006.01) |
| *G01S 13/04* | (2006.01) |
| *B62D 29/04* | (2006.01) |

(52) U.S. Cl.
CPC ............ *G01S 13/931* (2013.01); *B60J 5/0468* (2013.01); *G01S 7/03* (2013.01); *G01S 13/04* (2013.01); *B60J 5/042* (2013.01); *B60J 5/0481* (2013.01); *B62D 29/043* (2013.01); *G01S 2013/93274* (2020.01)

(58) Field of Classification Search
CPC .......... G01S 13/931; G01S 7/03; G01S 13/04; G01S 2013/93274; B60J 5/0468; B60J 5/042; B60J 5/0481; B62D 29/043
See application file for complete search history.

(56) References Cited

U.S. PATENT DOCUMENTS

| | | | | |
|---|---|---|---|---|
| 4,829,317 | A * | 5/1989 | Shinkawa | ............... H01Q 1/103 343/903 |
| 6,195,047 | B1 * | 2/2001 | Richards | ................... H01Q 1/38 343/754 |
| 7,132,976 | B2 | 11/2006 | Shinoda et al. | |
| 2003/0112174 | A1 * | 6/2003 | Kim | ....................... G01S 13/931 342/107 |

(Continued)

FOREIGN PATENT DOCUMENTS

| | | |
|---|---|---|
| CN | 1808177 A | 7/2006 |
| CN | 204222759 U | 3/2015 |

(Continued)

*Primary Examiner* — Peter M Bythrow
*Assistant Examiner* — Nazra Nur Waheed
(74) *Attorney, Agent, or Firm* — Hauptman Ham, LLP

(57) ABSTRACT

An installation structure for a vicinity information detection sensor includes the vicinity information detection sensor and a vibration absorbing member. The vicinity information detection sensor includes a detector attached to a vehicle inner side of an outer panel of a vehicle body and configured to radiate electromagnetic waves that function as radar waves that detect vicinity information of a vehicle, and a motor provided in the detector and configured to change a radiation direction of the electromagnetic waves. The vibration absorbing member is placed between the outer panel and the vicinity information detection sensor.

13 Claims, 12 Drawing Sheets

(56) References Cited

U.S. PATENT DOCUMENTS

| | | |
|---|---|---|
| 2006/0158369 A1 | 7/2006 | Shinoda et al. |
| 2008/0191571 A1 | 8/2008 | Fukuda et al. |
| 2014/0247181 A1* | 9/2014 | Nogueira-Nine ..... G01S 13/343 |
| | | 342/128 |
| 2015/0247924 A1* | 9/2015 | Kishigami .............. G01S 7/411 |
| | | 342/70 |
| 2016/0023624 A1 | 1/2016 | Schaaf |
| 2016/0137039 A1* | 5/2016 | Ferrus ................... B60J 5/0418 |
| | | 49/501 |
| 2016/0282155 A1 | 9/2016 | Hara |
| 2016/0297437 A1* | 10/2016 | Hara ..................... G01S 7/4813 |
| 2017/0217499 A1* | 8/2017 | Pencak .............. B60R 21/0136 |
| 2018/0074175 A1 | 3/2018 | O'Keeffe |
| 2021/0223396 A1* | 7/2021 | Butler ................... G02B 26/10 |

FOREIGN PATENT DOCUMENTS

| | | | |
|---|---|---|---|
| EP | 1269446 A1 | 1/2003 | |
| EP | 2808695 A2 * | 12/2014 | ............. G01S 7/521 |
| EP | 2966466 A2 | 1/2016 | |
| JP | H9304511 A | 11/1997 | |
| JP | 2001-16694 A | 1/2001 | |
| JP | 2008279658 A * | 11/2008 | |
| JP | 2015-68746 A | 4/2015 | |
| JP | 2015534052 A | 11/2015 | |
| JP | 2016-179752 A | 10/2016 | |
| JP | 2017173351 A | 9/2017 | |
| KR | 20190032078 A * | 9/2017 | |
| WO | 2006095630 A1 | 9/2006 | |

* cited by examiner

INSTALLATION STRUCTURE FOR VICINITY INFORMATION DETECTION SENSOR

INCORPORATION BY REFERENCE

The disclosure of Japanese Patent Application No. 2018-159175 filed on Aug. 28, 2018 including the specification, drawings and abstract is incorporated herein by reference in its entirety.

BACKGROUND

1. Technical Field

The disclosure relates to an installation structure for a vicinity information detection sensor.

2. Description of Related Art

In a structure disclosed in Japanese Unexamined Patent Application Publication No. 2016-179752 (JP 2016-179752 A), a vicinity information detection sensor having a millimeter-wave radar for detecting vicinity information of a vehicle is installed on a framework member (vehicle constituent member) of the vehicle. According to the related art, the vicinity information detection sensor is attached to the framework member of the vehicle, using fasteners, such as bolts.

SUMMARY

In some sensors for detecting vehicle vicinity information, a motor for changing the direction of radiation of radar waves may be installed. When the sensor equipped with the motor is used, there is room for improvement, in terms of prevention of transmission of operating noise of the motor to the interior of a vehicle cabin.

The disclosure provides an installation structure for a vicinity information detection sensor, which curbs transmission of operating noise of a motor to the interior of a vehicle cabin, in a vehicle in which the vicinity information detection sensor including the motor for changing the direction of radiation of radar waves is installed.

A first aspect of the disclosure is concerned with an installation structure for a vicinity information detection sensor. The installation structure for the vicinity information detection sensor includes the vicinity information detection sensor and a vibration absorbing member. The vicinity information detection sensor includes a detector attached to a vehicle inner side of an outer panel of a vehicle body, and configured to radiate electromagnetic waves that function as radar waves that detect vicinity information of a vehicle, and a motor provided in the detector and configured to change a radiation direction of the electromagnetic waves. The vibration absorbing member is placed between the outer panel and the vicinity information detection sensor.

In the first aspect, the vicinity information detection sensor includes the detector configured to radiate electromagnetic waves that function as radar waves for detecting vicinity information of the vehicle. Also, the vicinity information detection sensor is attached to the vehicle inner side of the outer panel of the vehicle body, and the vibration absorbing member is placed between the outer panel and the vicinity information detection sensor. With the vibration absorbing member thus placed between the outer panel and the vicinity information detection sensor, vibration caused by operating noise of the motor can be damped by the vibration absorbing member. As a result, the operating noise of the motor is less likely or unlikely to be transmitted to the interior of the vehicle cabin, through the outer panel.

In the first aspect, the vicinity information detection sensor may be attached to the outer panel via a retainer. The retainer may be fixed to the vicinity information detection sensor, and may include an elastic engaging piece that engages with the outer panel.

With the above arrangement, the retainer may be attached to the vicinity information detection sensor. Also, the retainer may include the elastic engaging piece that engages with the outer panel. Thus, since the vicinity information detection sensor is attached to the outer panel via the retainer, an adhesive or a double-sided adhesive tape, which has been used for mounting a sensor on the outer panel, will not be needed. It is thus possible to reduce the cost it takes to install the vicinity information detection sensor on the vehicle.

In the first aspect, the vibration absorbing member may be placed between the vicinity information detection sensor and the retainer.

With the above arrangement, the vibration absorbing member is interposed between the vicinity information detection sensor and the retainer, so that the vicinity information detection sensor, vibration absorbing member, and retainer can be brought into a pre-assembled state (ASSY). Thus, the vicinity information detection sensor can be easily mounted on the outer panel.

In the first aspect, the retainer may be fastened to the vicinity information detection sensor with a bolt, via an elastic member.

With the above arrangement, the retainer may be fastened to the vicinity information detection sensor with the bolt, via the elastic member. Thus, when vibration caused by operating noise of the motor is transmitted to the outer panel via a fastened portion of the vicinity information detection sensor and the retainer, the vibration is damped by the elastic member. In this manner, the vibration from the motor can also be damped by the elastic member, as well as the above vibration absorbing member; therefore, the operating noise of the motor is further less likely or unlikely to be transmitted to the interior of the vehicle cabin through the outer panel.

In the first aspect, the outer panel may be formed of a resin material, and the retainer may be formed of a resin material having substantially the same coefficient of thermal expansion as the resin material of the outer panel.

With the above arrangement, the outer panel and the retainer are formed of the resin materials having substantially the same coefficient of thermal expansion. Therefore, even when the outer panel thermally expands due to changes in the ambient temperature, and its dimensions are changed, backlash is less likely or unlikely to appear in its portion fixed with the retainer, and wear between the outer panel and the retainer is reduced.

As described above, the first aspect provides an excellent effect that transmission of operating noise of the motor to the interior of the vehicle cabin can be curbed or prevented.

The above arrangement provides an excellent effect that the cost it takes to install the vicinity information detection sensor on the vehicle can be reduced.

The above arrangement provides an excellent effect that the vicinity information detection sensor can be easily mounted on the outer panel.

The above arrangement provides an excellent effect that transmission of operating noise of the motor to the interior of the vehicle cabin can be further curbed.

The above arrangement provides an excellent effect that wear between the outer panel and the retainer can be reduced.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

First Embodiment

Figure 1:
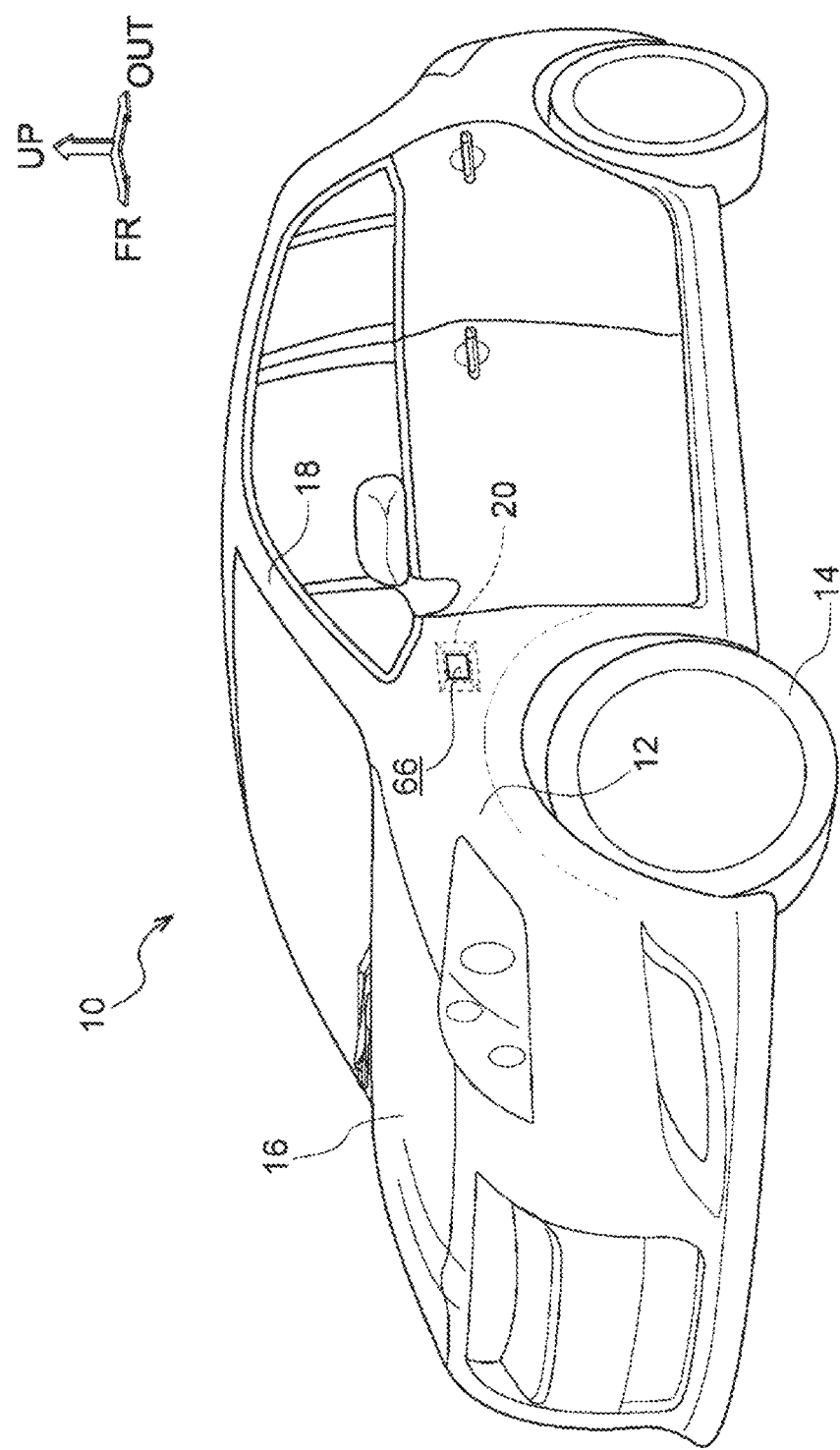
FIG. 1 is a perspective view showing a vehicle front part of a vehicle in which a vicinity information detection sensor according to a first embodiment is installed.

Referring to FIG. 1 through FIG. 7B, a vehicle 10 that employs an installation structure for a vicinity information detection sensor according to a first embodiment of the disclosure will be described. In FIG. 1, arrow FR indicates the vehicle front side of the vehicle on which the vicinity information detection sensor is mounted, and arrow UP indicates the vehicle upper side, while arrow OUT indicates the outer side in the vehicle width direction. When the longitudinal direction, vertical direction, and lateral direction are mentioned without being specified in the following description, they refer to the vehicle longitudinal direction, vehicle vertical direction, and vehicle lateral direction connecting the right and left sides when the viewer faces in the vehicle traveling direction, respectively.

Figure 2:
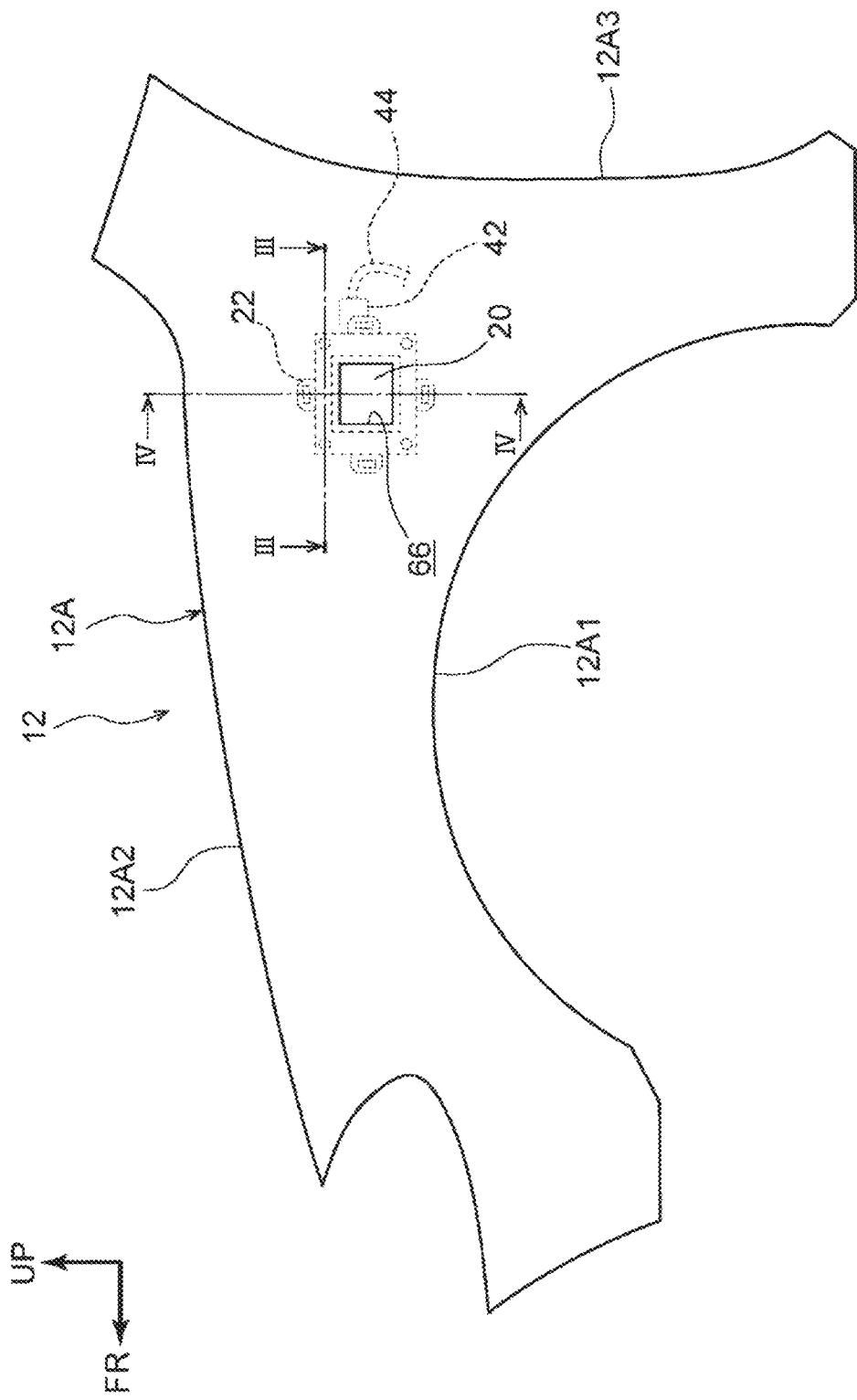
FIG. 2 is a side view of a front fender panel of the vehicle shown in FIG. 1.

As shown in FIG. 1, a front fender panel 12 (which will be simply called "fender panel 12") made of resin and serving as an outer panel of a vehicle body is placed on each of opposite side faces of a vehicle front part of the vehicle 10. As shown in FIG. 2, the fender panel 12 includes a vertical wall 12A that is located above each front wheel 14 and provides a design surface. The vertical wall 12A is formed like a plate, and is gently curved so as to be convex outward in the vehicle width direction. A lower end portion 12A1 of the vertical wall 12A is formed in an arcuate shape along the front wheel 14. An upper end portion 12A2 of the vertical wall 12A is located along an outer portion (in the vehicle width direction) of a hood 16 that provides an upper surface of a vehicle body front portion of the vehicle 10. A rear end portion 12A3 of the vertical wall 12A is superposed from the outer side on a front portion of a front pillar 18, which is also a middle portion in the vehicle vertical direction.

A vicinity information detection sensor 20 is disposed on the inner side in the vehicle width direction (which will be simply called "vehicle inner side") of the vertical wall 12A.

An apron upper member (not shown) is disposed on the inner side of the fender panel 12 in the vehicle width direction. The apron upper member is a vehicle framework member that is shaped like an elongated rectangular tube and extends from a lower end portion of the front pillar 18 toward the front of the vehicle. An inner end portion (in the vehicle width direction) of the upper end portion 12A2 of the fender panel 12 extends downward toward the apron upper member, and is joined to the apron upper member, via an impact-absorbing bracket (not shown).

The vehicle 10 is provided with a controller (with no reference numeral) that controls traveling of the vehicle 10, based on vicinity information detected by the vicinity information detection sensor 20. Also, the vicinity information detection sensor 20 is electrically connected to the controller. Namely, the vehicle 10 is configured to be able to travel under control of the controller, without requiring a driver to drive the vehicle 10. In this embodiment, the vehicle 10 is configured to be switched between an automatic driving mode in which the controller controls traveling of the vehicle 10, based on vicinity information detected by the vicinity information detection sensor 20, and a manual driving mode in which the driver operates a steering wheel (not shown) to cause the vehicle 10 to travel.

Installation Structure for Vicinity Information Detection Sensor

Figure 5:
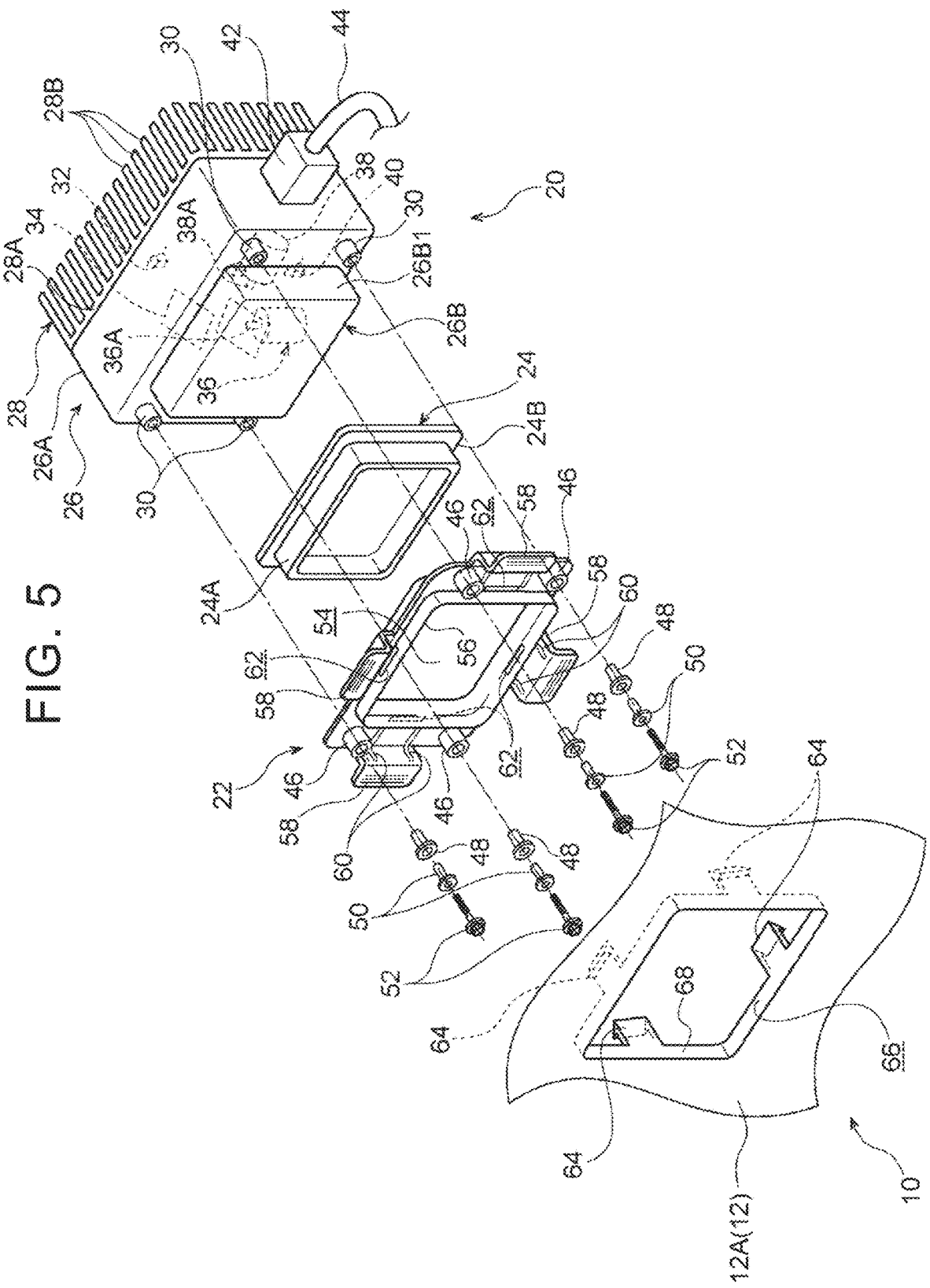
FIG. 5 is an exploded perspective view showing an installation structure for the vicinity information detection sensor shown in FIG. 1.

As shown in FIG. 5, the vicinity information detection sensor 20 is attached to an inside surface (in the vehicle width direction) of the vertical wall 12A of the fender panel 12, via a retainer 22. A vibration absorbing member 24 is interposed between the retainer 22 and the vicinity information detection sensor 20.

Figure 6:
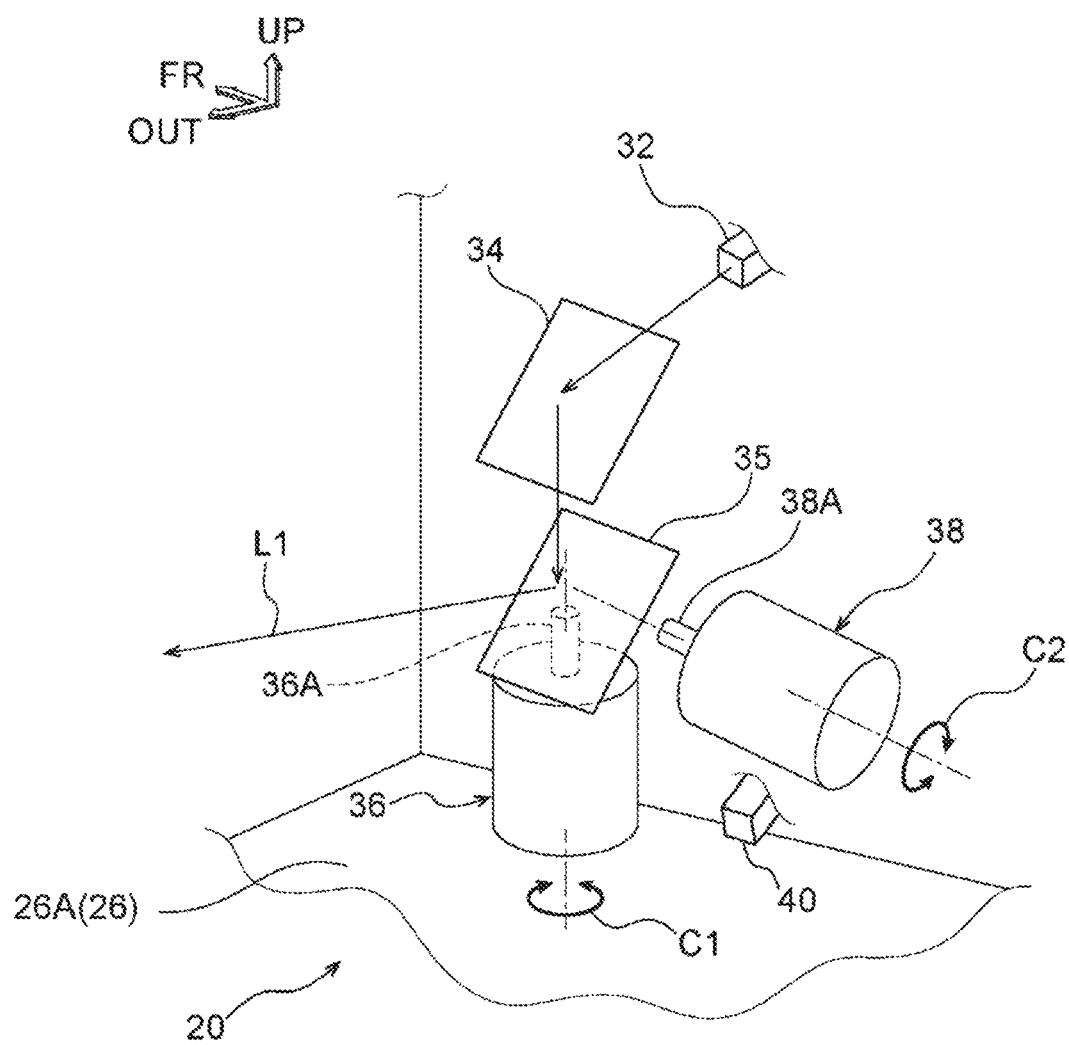
FIG. 6 is a schematic view illustrating the internal structure of the vicinity information detection sensor shown in FIG. 1.

As shown in FIG. 5 and FIG. 6, the vicinity information detection sensor 20 includes a detector 26 configured to detect information on the vicinity of the vehicle 10, and a heat radiator 28 provided on the vehicle inner side of the detector 26. The detector 26 includes a main body 26A in the form of a generally rectangular box, and a cover 26B in the form of a box that is provided on an outside surface (in the vehicle width direction) of the main body 26A and protrudes outward in the vehicle width direction. The vicinity information detection sensor 20 is, for example, a LIDAR (Light Imaging Detection and Ranging) sensor, millimeter-wave radar, quasi-millimeter-wave radar, infrared laser radar, or infrared laser scanner.

For example, the main body 26A is formed of an opaque resin material, and is shaped like a generally rectangular box. Bosses 30 having mounting holes are provided at four corners of the outside surface of the main body 26A. The cover 26B in the form of a box is provided inside the bosses 30 located at the four corners. The cover 26B is formed of a material that allows electromagnetic waves to be transmitted therethrough. In this embodiment, the cover 26B is formed of the same opaque resin material as the main body 26A. The fender panel 12 and the cover 26B have the same color as the body of the vehicle 10.

The heat radiator 28 is provided on an inside surface (in the vehicle width direction) of the main body 26A. The heat radiator 28 is a heat sink known in the art, and includes a base portion 28A in the form of a flat plate fixed to the inside surface of the main body 26A, for example. The heat radiator 28 also includes a plurality of fins 28B formed like rods, which are erected on an inside surface (in the vehicle width direction) of the base portion 28A, and the fins 28B serve to increase the surface area of the heat radiator 28. Thus, heat generated by the vicinity information detection sensor 20 is efficiently exchanged in the heat radiator 28; therefore, the internal temperature of the vicinity information detection sensor 20 is less likely or unlikely to rise.

The main body 26A incorporates a light-emitting element 32 that emits electromagnetic waves (see arrow L1 conceptually shown in FIG. 6) that function as radar waves, and a fixed mirror 34 that is fixed to the inside of the main body 26A, and reflects the electromagnetic waves emitted from the light-emitting element 32. The main body 26A also incorporates a mobile mirror 35 that reflects the electromagnetic waves reflected by the fixed mirror 34 in a given angular direction, and first motor 36 and second motor 38 that turn the mobile mirror 35 in given angle directions. Further, the main body 26A incorporates a light receiving element 40 that receives reflected waves when the electromagnetic waves radiated from the detector 26 hit against an obstacle outside the vehicle and are reflected by the obstacle.

The first motor 36 and second motor 38 are configured to be supplied with electric power and driven via a connector 42. The connector 42 is connected to a harness 44 coupled to an electric system of the vehicle. The first motor 36 has a rotary shaft 36A disposed in a generally vertical direction as its axial direction in the interior of the main body 26A. As the first motor 36 rotates, the mobile mirror 35 turns about the rotary shaft 36A, using power transmitted from the rotary shaft 36A (see directions of arrow C1 shown in FIG. 6). As a result, the orientation of the mirror plane of the mobile mirror 35 changes along the horizontal direction. Then, the electromagnetic waves reflected by the mobile mirror 35 and transmitted through the cover 26B are radiated from the detector 26 in a radial fashion in the horizontal direction.

The second motor 38 has a rotary shaft 38A disposed in a generally horizontal direction as its axial direction in the interior of the main body 26A. As the second motor 38 rotates, the mobile mirror 35 turns about the rotary shaft 38A, using power transmitted from the rotary shaft 38A (see directions of arrow C2 shown in FIG. 6). As a result, the orientation of the mirror plane of the mobile mirror 35 changes vertically. Then, the electromagnetic waves reflected by the mobile mirror 35 and transmitted through the cover 26B are radiated from the detector 26 in a radial fashion in the vertical direction.

Figure 7A:
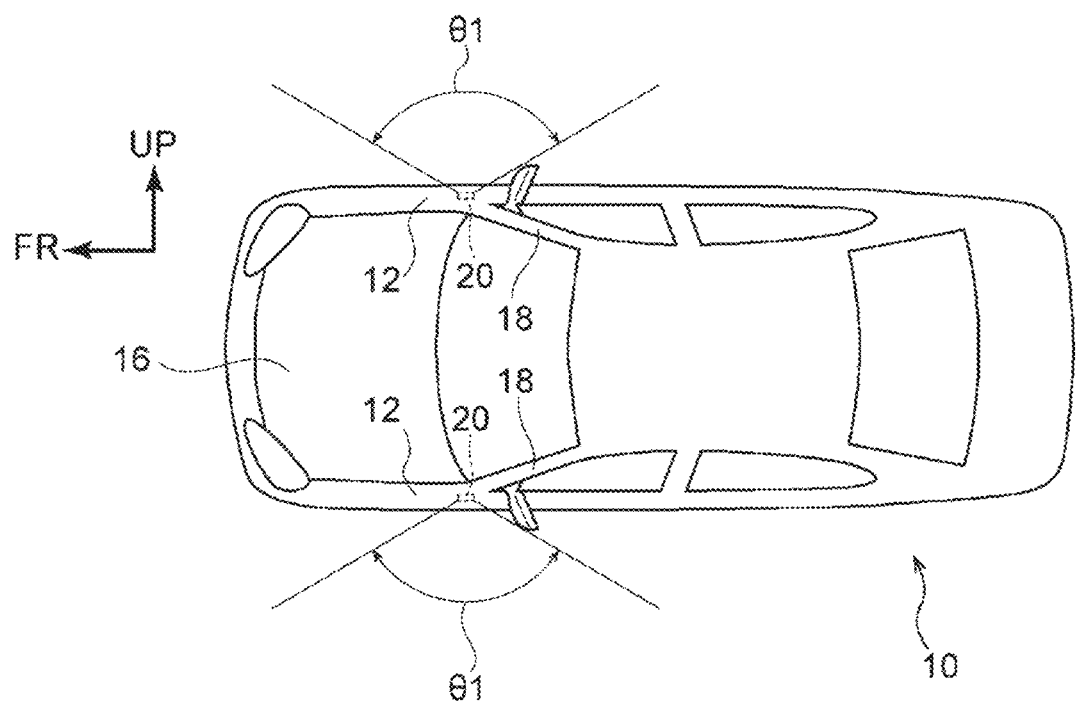
FIG. 7A is a plan view schematically showing a sensing region in a horizontal direction, of the vicinity information detection sensor, in the vehicle shown in FIG. 1.
Figure 7B:
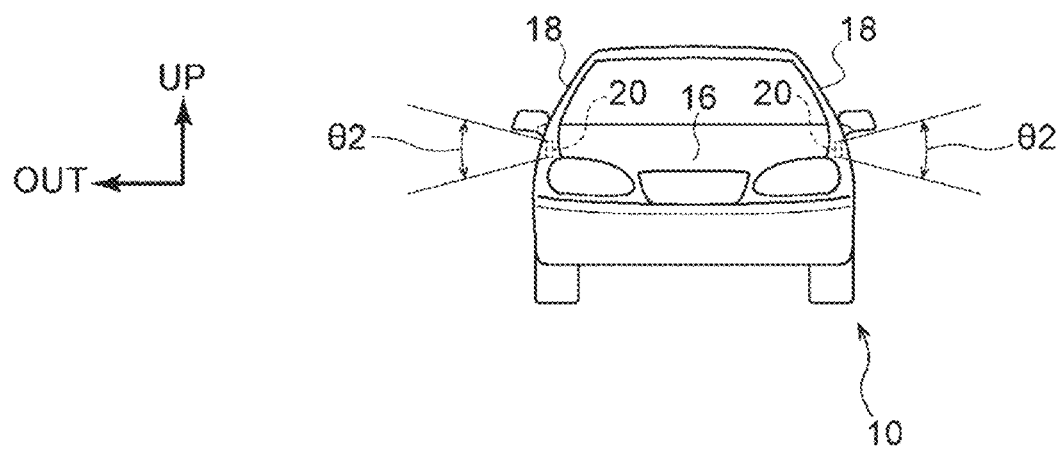
FIG. 7B is a front view schematically showing a sensing region in a vertical direction, of the vicinity information detection sensor, in the vehicle shown in FIG. 1.

FIG. 7A, which is a plan view of the vehicle 10, shows a sensing angle θ1 in the horizontal direction of the detector 26. On the other hand, FIG. 7B, which is a front view of the vehicle 10, shows a sensing angle θ2 in the vertical direction of the detector 26. In this embodiment, the vicinity information detection sensor 20 is configured to adjust the direction of radiation of electromagnetic waves, within regions indicated by the sensing angles θ1, θ2.

As shown in FIG. 5, the vibration absorbing member 24 is mounted on the cover 26B of the detector 26, specifically, on side faces 26B1 erected from the main body 26A. The vibration absorbing member 24 is formed from an elastic body made of natural rubber, and includes a side wall portion 24A in the form of a generally rectangular frame as viewed from one side in the vehicle width direction, and a flange portion 24B that extends in the form of a flange from an inner end portion (in the vehicle width direction) of the side wall portion 24A. The vibration absorbing member 24 may be formed of a material, such as nitrile rubber (NBR), ethylene-propylene-diene rubber (EPDM), chlorosulfonated polyethylene (CSM), acrylic rubber (ACM), epichlorohydrin rubber (ECO), fluoro-rubber (FKM), and a polymer alloy (NBR/PVC) of nitrile rubber and polyvinyl chloride.

Figure 3:
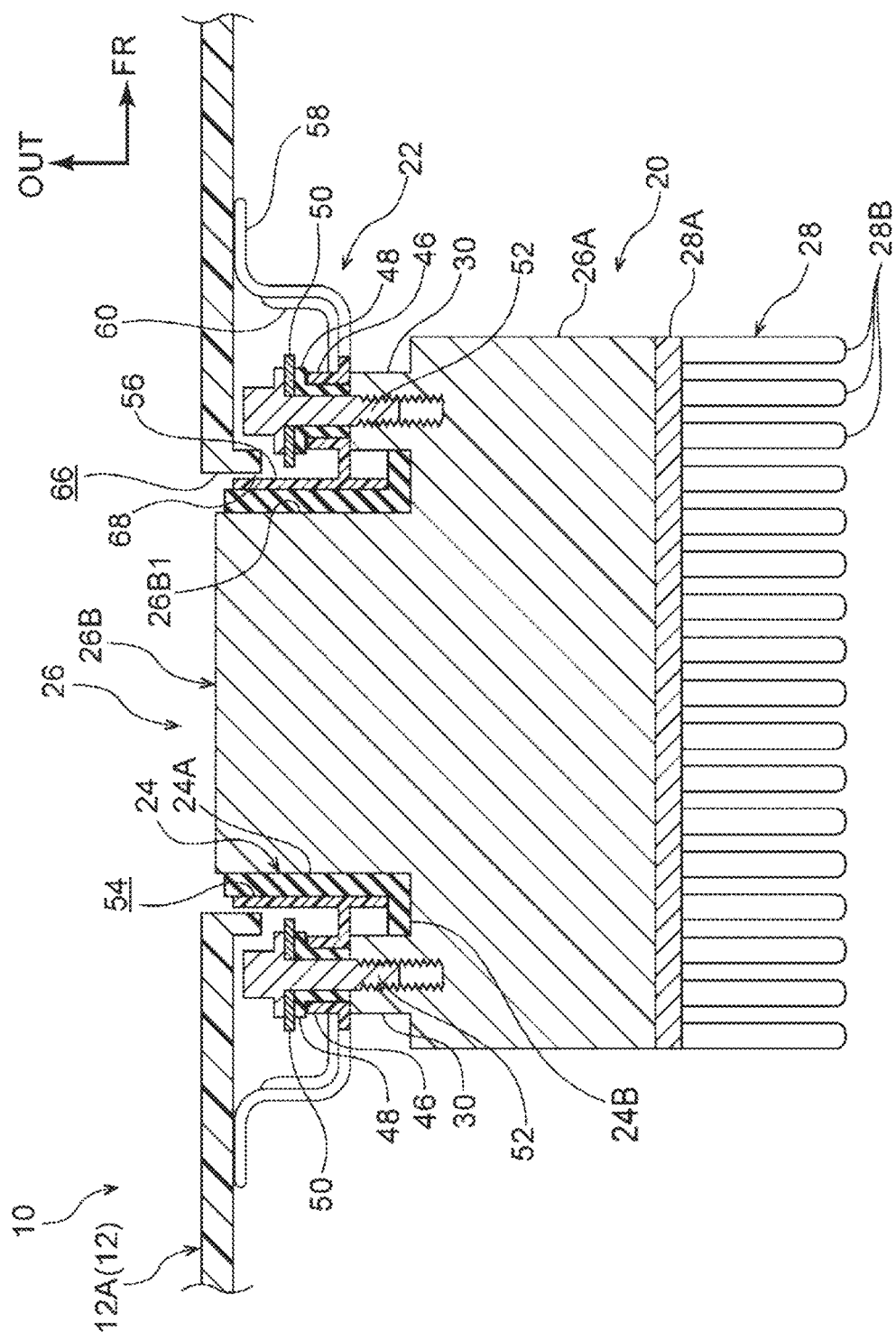
FIG. 3 is an enlarged cross-sectional view showing a section taken along line III-III of FIG. 2 and enlarged.

Further, the retainer 22 is attached to the detector 26 from the outer side in the vehicle width direction (which will be simply called "vehicle outer side"). The retainer 22 is formed like a generally rectangular plate as viewed from one side in the vehicle width direction. Cylindrical holding portions 46 that stand outward in the vehicle width direction are integrally formed at four corners of the retainer 22. The holding portions 46 are located coaxially with the bosses 30 formed on the main body 26A of the detector 26. Shaft portions of bolts 52 are inserted from the vehicle outer side into the holding portions 46, and distal ends of the shaft portions are screwed into the bosses 30, so that the retainer 22 is bolted to the detector 26. More specifically, a first collar 48 formed of an elastic material, such as natural rubber, a second collar 50 formed of a metal material, and bolt 52 are inserted in this order from the vehicle outer side into each of the holding portions 46. In other words, the retainer 22 and the vicinity information detection sensor 20 are fastened with the bolts 52, via the first collars 48 formed of the elastic material (see FIG. 3). The first collar 48 corresponds to one example of "elastic member" according to the disclosure. In FIG. 3, the connector 42 and the harness 44 are not illustrated, for the sake of convenience in description. The first collar 48 may be formed of a material, such as nitrile rubber (NBR), ethylene-propylene-diene rubber (EPDM), chlorosulfonated polyethylene (CSM), acrylic rubber (ACM), epichlorohydrin rubber (ECO), fluoro-rubber (FKM), or a polymer alloy (NBR/PVC) of nitrile rubber and polyvinyl chloride.

In the meantime, the retainer 22 has an opening 54 having a generally rectangular shape as viewed from one side in the vehicle width direction, and a frame portion 56 provided at the periphery of the opening 54. The opening 54 is formed inside the holding portions 46 provided at the four corners of the retainer 22. The frame portion 56 extends both outward and inward in the vehicle width direction, from the periphery of the opening 54. In a condition where the retainer 22 is fixed to the vicinity information detection sensor 20, the cover 26B of the detector 26 is inserted in the opening 54. In this condition, the inner periphery of the frame portion 56 abuts against the outer periphery of the vibration absorbing member 24. Thus, the vibration absorbing member 24 is located between the vicinity information detection sensor 20 and the retainer 22 (see FIG. 3).

Also, elastic engaging pieces 58 are formed integrally on the four sides that constitute the outer periphery of the retainer 22 formed like a generally rectangular plate. Each of the elastic engaging pieces 58 extends outward from the outer periphery of the retainer 22, and is curved into an arcuate shape over a range from its middle portion to its distal end portion, such that the distal end portion slightly bends backward to the outside of the retainer 22. As shown in FIG. 5, reinforcement ribs 60 are formed on each elastic engaging piece 58 in a direction of extension thereof.

Further, at the outside of the frame portion 56, upper, lower, right and left cutouts 62 in the form of slots that extend through the retainer 22 in the vehicle width direction are respectively formed along the outer periphery of the frame portion 56. The cutouts 62 are configured to be engaged with claw portions 64 formed integrally on the fender panel 12 side.

The claw portions 64 extend from a generally rectangular opening 66 formed in the vertical wall 12A of the fender panel 12. The opening 66 is formed in a portion of the vertical wall 12A which is opposed to the vicinity information detection sensor 20 in the vehicle width direction. More specifically, a wall portion 68 that stands inward in the vehicle width direction is formed integrally on the vertical wall 12A, to extend from the periphery of the opening 66. Namely, the wall portion 68 is formed like a generally rectangular frame, as viewed from one side in the vehicle width direction. Also, the claw portions 64 are formed so as to extend inward in the vehicle width direction, from end portions on the vehicle inner side of four sides that constitute the wall portion 68.

In this connection, the inside dimensions of the wall portion 68 are slightly larger than the outside dimensions of the frame portion 56 formed on the retainer 22 side. Accordingly, when the frame portion 56 of the retainer 22 is pressed against the fender panel 12 so as to be aligned with the opening 66, the frame portion 56 is received inside the wall portion 68. Then, the claw portions 64 that extend from the wall portion 68 are positioned to be aligned with the cutouts 62 formed in the retainer 22. In this condition, distal end portions of the elastic engaging pieces 58 of the retainer 22 abut against the vehicle inner surface of the fender panel 12.

Figure 4:
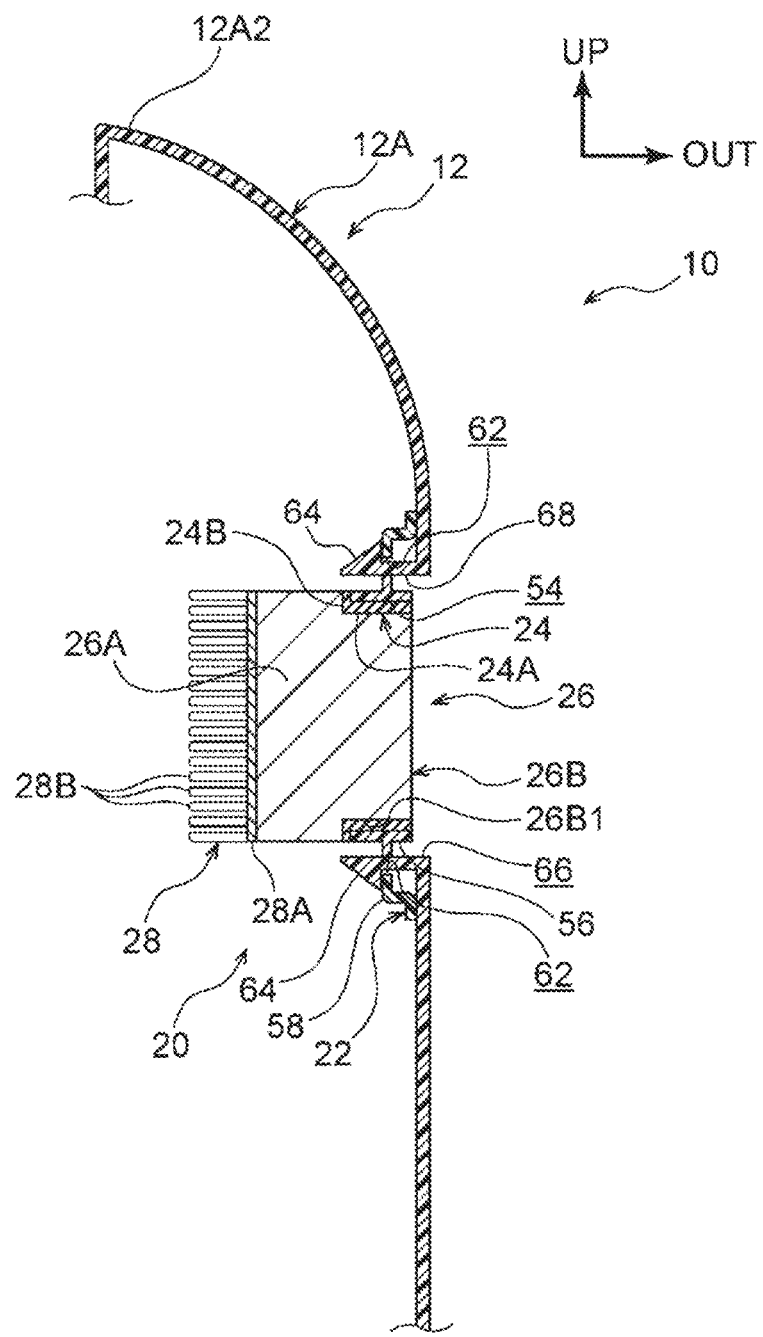
FIG. 4 is a cross-sectional view showing a section taken along line IV-IV of FIG. 2 and enlarged.

Then, the retainer 22 is pressed against the fender panel 12, so that the elastic engaging pieces 58 are elastically deformed in such a direction as to be pushed outward of the retainer 22, and the claw portions 64 are engaged with the cutouts 62. In this manner, the retainer 22 and the fender panel 12 are fixed to each other (see FIG. 4). In FIG. 4, the connector 42 and the harness 44 are not illustrated for the sake of convenience in description.

Also, in this condition, the claw portions 64 are pressed against the edges of the cutouts 62, under the bias force of the elastic engaging pieces 58 that are urged to be spaced from the fender panel 12 due to elastic restoring force. Therefore, the rigidity in mounting of the retainer 22 and the fender panel 12 is enhanced.

In this embodiment, the retainer 22 is formed of the same material as the resin material that forms the fender panel 12. As one example, the retainer 22 is made of polypropylene. Meanwhile, the detector 26 of the vicinity information detection sensor 20 is formed of a resin material having high heat resistance. As one example, the detector 26 is made of polyphenylene sulfide. In other words, the resin material that forms the retainer 22 has a higher coefficient of thermal expansion than the resin material that forms the detector 26 of the vicinity information detection sensor 20.

Thus, even when the fender panel 12 thermally expands due to changes in the ambient temperature, and its dimensions change, backlash is less likely to appear in its portion fixed with the retainer 22, and wear is less likely to arise between the fender panel 12 and the retainer 22. Meanwhile, the linear expansion coefficient of the resin material of the detector 26 is set to be small, so that the detector 26 is less likely or unlikely to be damaged by heat from the heat radiator 28, etc.

Operation and Effect

Next, the operation and effect of the vehicle 10 including the vicinity information detection sensor 20 according to this embodiment will be described.

In this embodiment, the vicinity information detection sensor 20 includes the detector 26 that radiates electromagnetic waves that function as radar waves for detecting information on the vicinity of the vehicle 10. Also, the vicinity information detection sensor 20 is attached to the vehicle inner side of the fender panel 12, and the vibration absorbing member 24 is disposed between the fender panel 12 and the vicinity information detection sensor 20. With the vibration absorbing member 24 thus interposed between the fender panel 12 and the vicinity information detection sensor 20, vibration caused by operating noise of the first motor 36 and second motor 38 provided in the detector 26 can be damped by the vibration absorbing member 24. As a result, the operating noise of the first motor 36 and second motor 38 is less likely or unlikely to be transmitted to the interior of the vehicle cabin through the fender panel 12.

Also, in this embodiment, the retainer 22 is fixed to the vicinity information detection sensor 20. Also, the retainer 22 includes the elastic engaging pieces 58 engaged with the fender panel 12. Thus, the vicinity information detection sensor 20 is attached to the fender panel 12 via the retainer 22; therefore, an adhesive or a double-sided adhesive tape, which has been used for attaching a sensor to the fender panel 12, will not be needed. It is thus possible to reduce the cost it takes to install the vicinity information detection sensor 20 in the vehicle 10.

In this embodiment, the vibration absorbing member 24 is placed between the vicinity information detection sensor 20 and the retainer 22. Therefore, the vicinity information detection sensor 20, vibration absorbing member 24, and retainer 22 can be brought into a pre-assembled state (ASSY). Thus, the vicinity information detection sensor 20 can be easily mounted on the fender panel 12.

Also, in this embodiment, the retainer 22 is bolted to the vicinity information detection sensor 20 via the first collars 48 formed of the elastic material. Therefore, vibration caused by operating noise of the first motor 36 and second motor 38 and transmitted to the fixed portions of the vicinity information detection sensor 20 and the retainer 22 is damped by the first collars 48. Thus, the operating noise of the first motor 36 and second motor 38 is further less likely or unlikely to be transmitted to the interior of the vehicle cabin through the fender panel 12.

Further, when the retainer 22 and the detector 26 of the vicinity information detection sensor 20 are formed of resin materials having different coefficients of thermal expansion, as in this embodiment, the retainer 22 and the vicinity information detection sensor 20 may thermally expand to have different dimensions, due to changes in the ambient temperature, and backlash may appear in the fixed portions. However, in this embodiment, the backlash is absorbed by the first collars 48, and therefore, the retainer 22 and the vicinity information detection sensor 20 can be favorably kept in the fixed state.

Also, in this embodiment, the fender panel 12 and the retainer 22 are formed of the resin materials having substantially the same coefficient of thermal expansion. Therefore, even when the fender panel 12 thermally expands due to changes in the ambient temperature, and its dimensions are changed, backlash is less likely to appear in the fixed portions of the fender panel 12 and the retainer 22, and wear is less likely or unlikely to arise between the fender panel 12 and the retainer 22.

Further, in this embodiment, the vibration absorbing member 24 is placed between the retainer 22 and the vicinity information detection sensor 20, and the retainer 22 and the vicinity information detection sensor 20 are fixed via the first collars 48 formed of the elastic material. Therefore, heat generated at the heat radiator 28 of the vicinity information detection sensor 20 is less likely or unlikely to be transmitted to the retainer 22. As a result, the retainer 22 is less likely or unlikely to thermally expand due to the heat of the heat radiator 28, and backlash is less likely or unlikely to appear in the fixed portions of the retainer 22 and the fender panel 12.

While the vicinity information detection sensor 20 is placed on the vehicle inner side of the front fender panel 12 in this embodiment, a vicinity information detection sensor may be placed on the vehicle inner side of a rear fender panel, for example.

Second Embodiment

Figure 8:
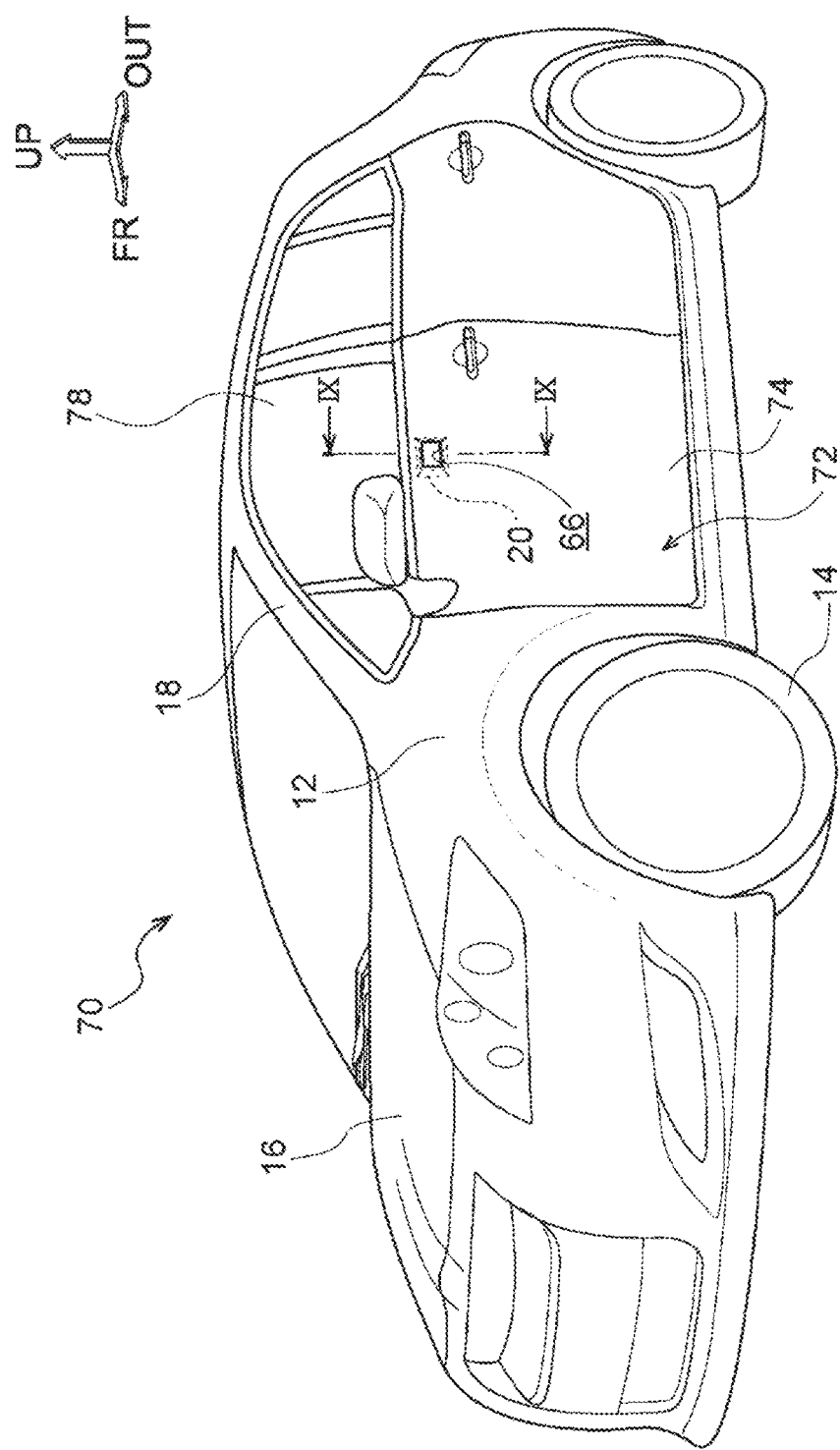
FIG. 8 is a perspective view showing a vehicle front part of a vehicle in which a vicinity information detection sensor according to a second embodiment is installed.
Figure 9:
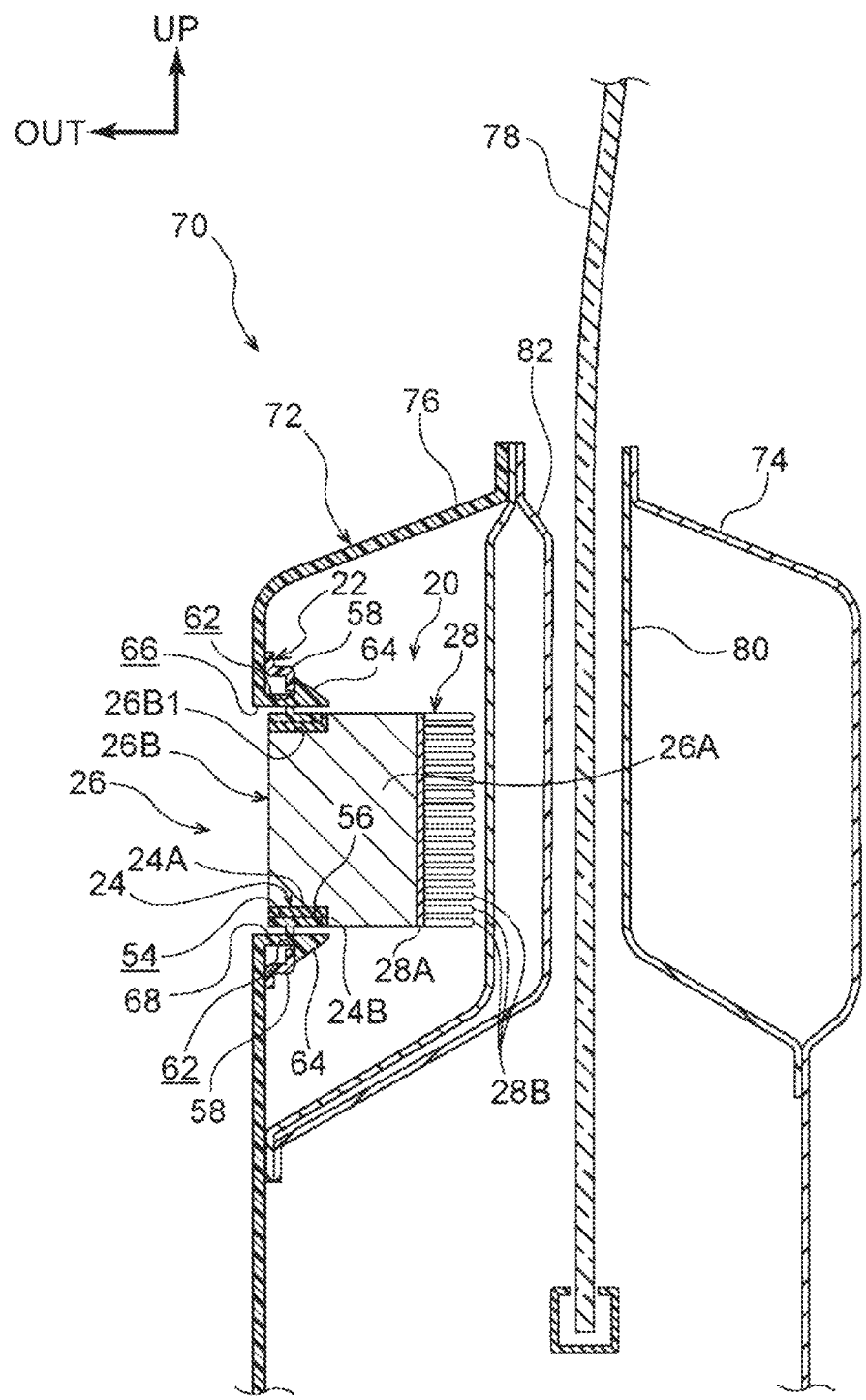
FIG. 9 is a cross-sectional view showing a section taken along line IX-IX of FIG. 8.

Referring next to FIG. 8 and FIG. 9, a vehicle 70 that employs an installation structure for a vicinity information detection sensor according to a second embodiment of the disclosure will be described. The same reference numerals are assigned to components similar to those of the first embodiment, and these components will not be further described.

As shown in FIG. 8, the vicinity information detection sensor 20 according to this embodiment is placed inside a front side door 72 of the vehicle 70.

The front side door 72 includes an inner door panel 74 and an outer door panel 76, and a front side window 78 is placed between the inner door panel 74 and the outer door panel 76.

The inner door panel 74 is located on the vehicle inner side, and provides an inner panel of the front side door 72, and an inner belt-line reinforcement 80 (which will be simply called "inner RF 80") is placed on the vehicle outer side of an upper end portion of the inner door panel 74. The inner RF 80 extends along a door belt line in the vehicle longitudinal direction, and flange portions (with no reference numerals) formed in an upper end portion and a lower end portion of the inner RF 80 are joined by welding, or the like, to the inner door panel 74. In this manner, a closed cross-section structure is formed by the inner door panel 74 and the inner RF 80.

On the other hand, the outer door panel 76 as an outer panel of the vehicle body is located on the vehicle outer side, and provides a design surface of the front side door 72. An outer belt-line reinforcement 82 (which will be simply called "outer RF 82") is placed on the vehicle inner side of an upper end portion of the outer door panel 76. The outer RF 82 extends along the door belt line in the vehicle longitudinal direction, and has a closed cross-section structure, as a cross-sectional shape taken along the vehicle width direction. Also, flange portions, which are formed in an upper end portion and a lower end portion of the outer RF 82, are joined to a vehicle inner surface of the outer door panel 76. Thus, a closed cross-section is formed by the outer door panel 76 and the outer RF 82.

As in the first embodiment, the vicinity information detection sensor 20 is attached to the vehicle inner side of the outer door panel 76, via the retainer 22. More specifically, an opening 66 having a generally rectangular shape as viewed from one side in the vehicle width direction is formed in a portion of the outer door panel 76 which is opposed to the vicinity information detection sensor 20. Then, claw portions 64, which are integrally formed at the opening 66, are engaged with cutouts 62 of the retainer 22 fixed to the vicinity information detection sensor 20. Thus, the vicinity information detection sensor 20 is fixed to the outer door panel 76 via the retainer 22. The vicinity information detection sensor 20, opening 66, claw portions 64, and retainer 22 are configured similarly to those of the first embodiment, and therefore, will not be described in detail.

The retainer 22 is formed of the same material as the resin material that forms the outer door panel 76.

Operation and Effect

The installation structure for the vicinity information detection sensor 20 according to this embodiment basically follows the arrangement of the first embodiment; therefore, this embodiment yields substantially the same effects.

In this embodiment, the vicinity information detection sensor 20 is located at a position overlapping the inner RF 80 and the outer RF 82 as viewed from one side in the vehicle width direction. However, the disclosure is not limited to this arrangement. For example, the vicinity information detection sensor 20 may be located below the inner RF 80 and the outer RF 82 as viewed from one side in the vehicle width direction.

Third Embodiment

Figure 10:
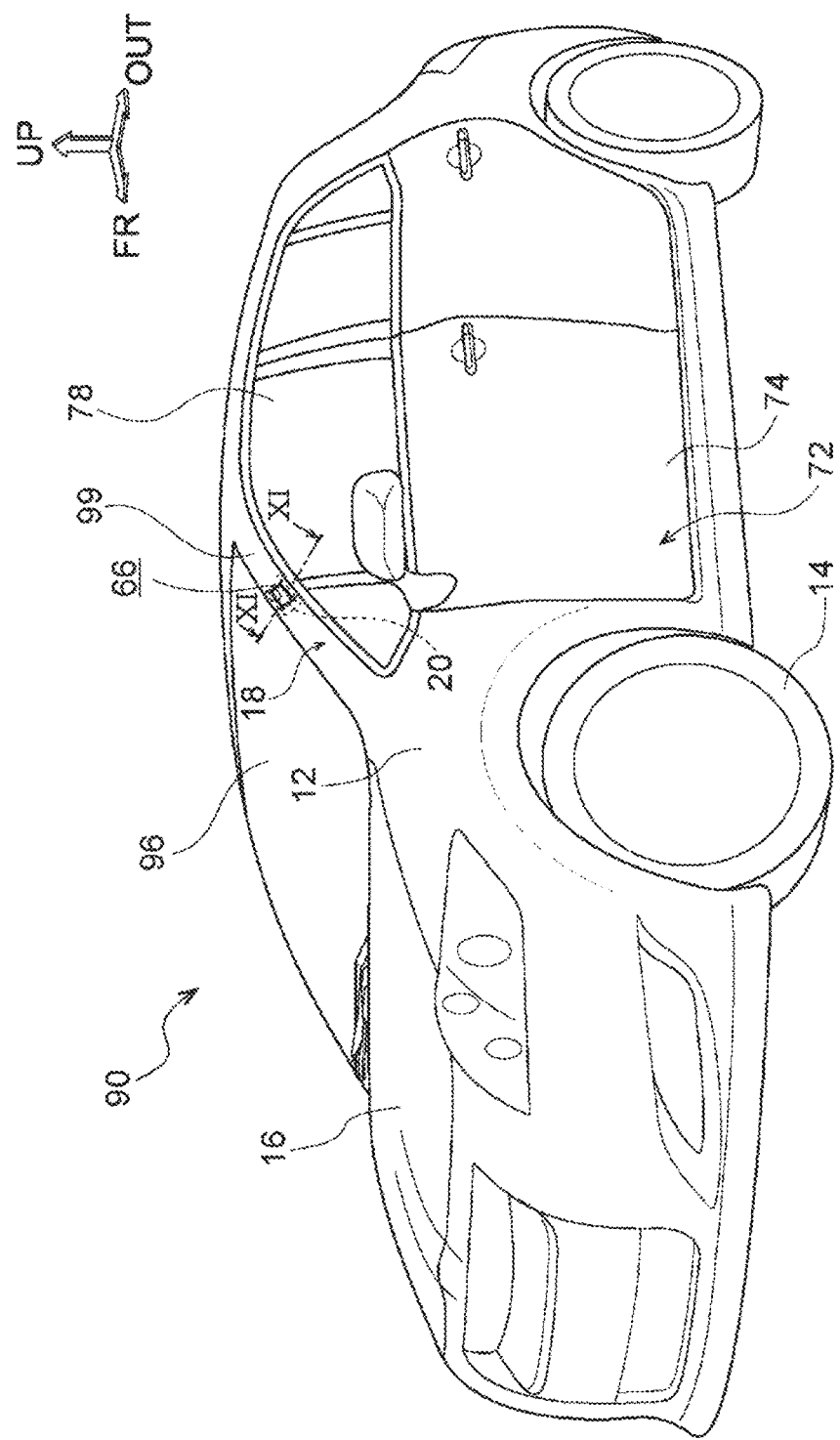
FIG. 10 is a perspective view showing a vehicle front part of a vehicle in which a vicinity information detection sensor according to a third embodiment is installed.
Figure 11:
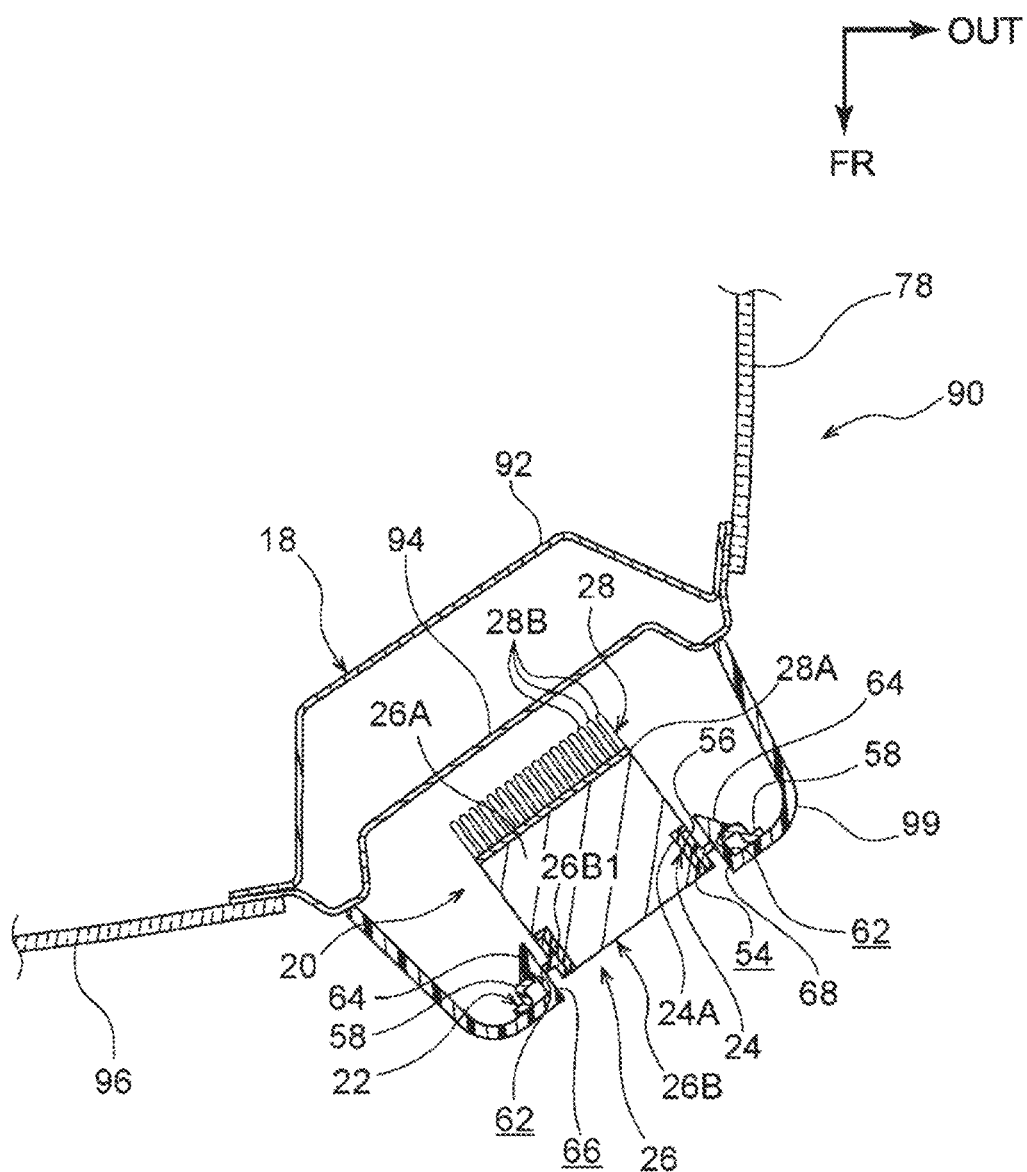
FIG. 11 is a cross-sectional view showing a section taken along line XI-XI of FIG. 10 and enlarged.

Referring next to FIG. 10 and FIG. 11, a vehicle 90 that employs an installation structure for a vicinity information detection sensor according to a third embodiment of the disclosure will be described. The same reference numerals are assigned to components similar to those of the first embodiment, and these components will not be further described.

As shown in FIG. 10, the vicinity information detection sensor 20 according to this embodiment is placed in the upper part of the front pillar 18 of the vehicle 90. More specifically, the vicinity information detection sensor 20 is placed on the vehicle inner side of a pillar garnish 99 (which will be simply called "garnish 99") that serves as an outer panel of the vehicle body, and provides a design surface of the front pillar 18 having a closed cross-section structure.

As shown in FIG. 11, the front pillar 18 includes an inner pillar panel 92 and an outer pillar panel 94. The inner pillar panel 92 is located on the vehicle inner side, extends in the vehicle vertical direction, and is formed from a steel plate, as one example. Also, the inner pillar panel 92 is formed generally in the shape of a hat in cross-section taken along the vehicle width direction, such that the hat is open to the front side of the vehicle and the outer side in the vehicle width direction.

The outer pillar panel 94 is located on the vehicle outer side of the inner pillar panel 92. The outer pillar panel 94 extends in the vehicle vertical direction, and is formed from a steel plate, as one example. Flange portions (with no reference numerals) are formed at opposite end portions (in the vehicle width direction) of the outer pillar panel 94 and inner pillar panel 92, and corresponding ones of the flange portions are superposed on each other and joined together. Thus, the inner pillar panel 92 and the outer pillar panel 94 form a closed cross-section. Then, an outer edge portion of a windshield glass 96 is joined to the vehicle outer side of an inner end portion (in the vehicle width direction) of the outer pillar panel 94. On the other hand, an outer edge portion of the front side window 78 is joined to the vehicle outer side of an outer end portion (in the vehicle width direction) of the outer pillar panel 94.

Also, the garnish 99 is placed along the outer pillar panel 94, on the vehicle outer side of the outer pillar panel 94. The garnish 99 is formed of a resin material, and extends in the vehicle vertical direction along an end portion of the windshield glass 96.

As in the first embodiment, the vicinity information detection sensor 20 is attached to the vehicle inner side of the garnish 99, via the retainer 22. More specifically, an opening 66 having a generally rectangular shape as viewed from one side in the vehicle width direction is formed in a portion of the garnish 99 which is opposed to the vicinity information detection sensor 20. Then, claw portions 64, which are integrally formed at the opening 66, are engaged with cutouts 62 of the retainer 22 fixed to the vicinity information detection sensor 20. Thus, the vicinity information detection sensor 20 is fixed to the garnish 99 via the retainer 22. The vicinity information detection sensor 20, opening 66, claw portions 64, and retainer 22 are configured similarly to those of the first embodiment, and therefore, will not be described in detail.

The retainer 22 is formed of the same material as the resin material that forms the garnish 99.

Operation and Effect

The installation structure for the vicinity information detection sensor 20 according to this embodiment basically follows the arrangement of the first embodiment; therefore, this embodiment yields substantially the same effects.

In this embodiment, the vicinity information detection sensor 20 is placed on the vehicle inner side of the garnish 99 of the front pillar 18. However, the disclosure is not limited to this arrangement. For example, the vicinity information detection sensor may be placed on the vehicle inner side of a pillar garnish of a center pillar or a rear pillar.

Fourth Embodiment

Figure 12:
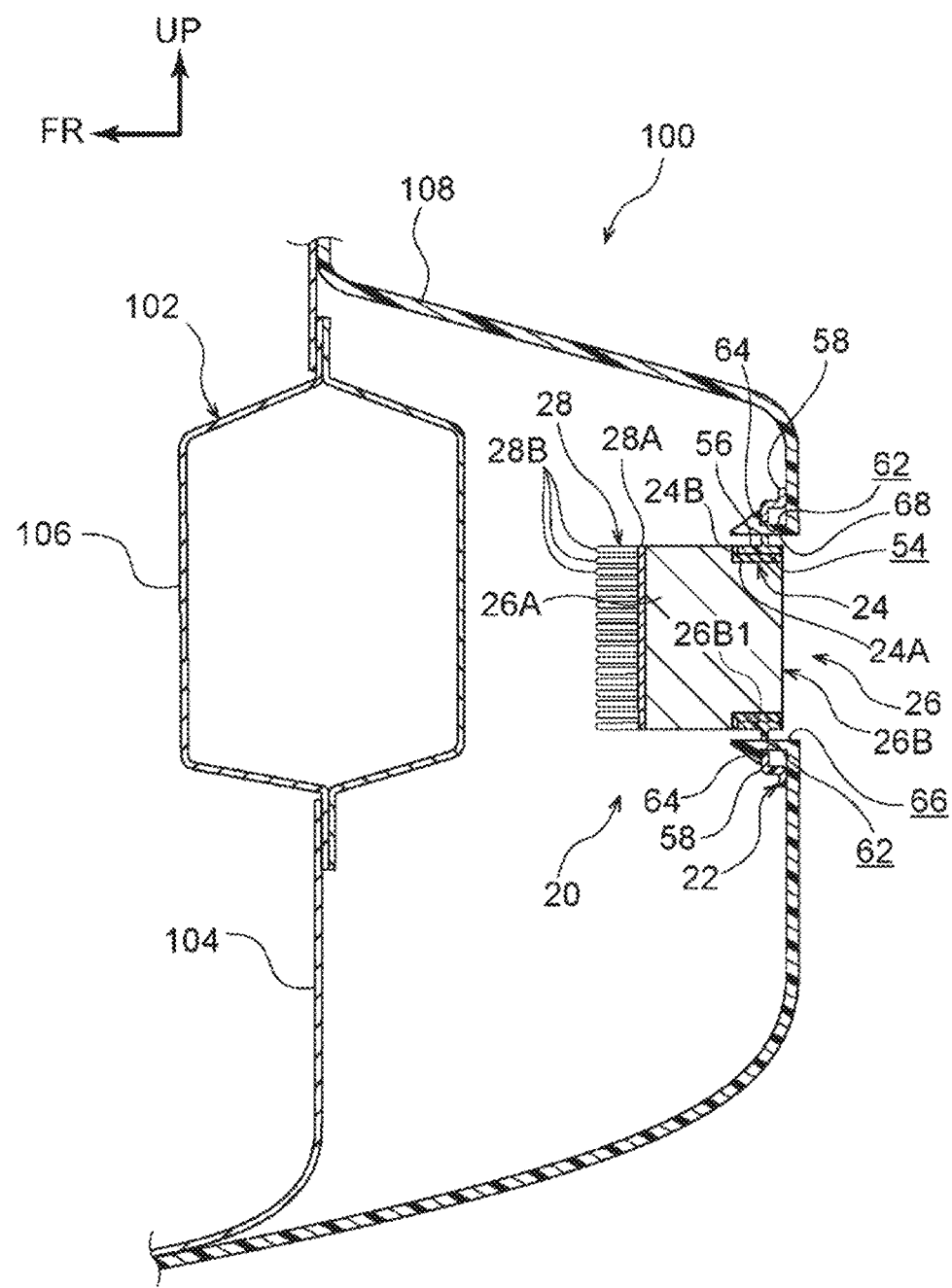
FIG. 12 is a cross-sectional view showing a rear bumper of a vehicle in which a vicinity information detection sensor according to a fourth embodiment is installed, in cross-section taken vertically along a vehicle longitudinal direction.

Referring next to FIG. 12, a vehicle 100 that employs an installation structure for a vicinity information detection sensor according to a fourth embodiment of the disclosure will be described. The same reference numerals are assigned to components similar to those of the first embodiment, and these components will not be further described.

As shown in FIG. 12, the vicinity information detection sensor 20 according to this embodiment is placed in a rear bumper 102 that constitutes a lower part of the vehicle 100 on the vehicle rear side. More specifically, the vicinity information detection sensor 20 is placed on the vehicle inner side of a rear bumper cover 108 that constitutes the rear bumper 102.

A rear floor pan 104 is disposed in the vehicle lower part on the vehicle rear side, and a rear bumper reinforcement 106 (which will be simply called "rear bumper RF 106") as a vehicle framework member having a closed cross-section structure is placed in a rear end portion of the rear floor pan 104. Then, the rear bumper cover 108 is placed on the vehicle outer side (vehicle rear side) of the rear bumper RF 106, so as to cover the rear bumper RF 106 from the vehicle rear side. The rear bumper cover 108 is formed of a resin material, as one example.

As in the first embodiment, the vicinity information detection sensor 20 is attached to the vehicle inner side of the rear bumper cover 108, via the retainer 22. More specifically, an opening 66 having a generally rectangular shape as viewed from one side in the vehicle longitudinal direction is formed in a portion of the rear bumper cover 108 which is opposed to the vicinity information detection sensor 20. Then, claw portions 64, which are integrally formed at the opening 66, are engaged with the cutouts 62 of the retainer 22 fixed to the vicinity information detection sensor 20. Thus, the vicinity information detection sensor 20 is fixed to the rear bumper cover 108 via the retainer 22. The vicinity information detection sensor 20, opening 66, claw portions 64, and retainer 22 are configured similarly to those of the first embodiment, and therefore, will not be described in detail.

The retainer 22 is formed of the same material as the resin material that forms the rear bumper cover 108.

Operation and Effect

The installation structure for the vicinity information detection sensor 20 according to this embodiment basically follows the arrangement of the first embodiment; therefore, this embodiment yields substantially the same effects.

In this embodiment, the vicinity information detection sensor 20 is placed on the vehicle inner side of the rear bumper cover 108 of the rear bumper 102. However, the disclosure is not limited to this arrangement. For example, the vicinity information detection sensor may be placed on the vehicle inner side of a front bumper cover of a front bumper.

What is claimed is:
1. An installation structure for a vicinity information detection sensor, comprising:
    the vicinity information detection sensor that includes
        a detector attached to a vehicle inner side of an outer panel of a vehicle body, and configured to radiate electromagnetic waves functioning as radar waves that detect vicinity information of a vehicle, and
        a motor provided in the detector and configured to change a radiation direction of the electromagnetic waves; and
    a vibration absorbing member between the outer panel and the vicinity information detection sensor, wherein the vibration absorbing member does not directly contact the outer panel wherein
    the vicinity information detection sensor is attached to the outer panel via a retainer, the retainer being fixed to the vicinity information detection sensor and including an elastic engaging piece that engages with the outer panel, and
    the outer panel is formed of a resin material, and the retainer is formed of a resin material having the same coefficient of thermal expansion as the resin material of the outer panel.
2. The installation structure for the vicinity information detection sensor according to claim 1, wherein
    the vibration absorbing member is placed between the vicinity information detection sensor and the retainer.

3. The installation structure for the vicinity information detection sensor according to claim 1, wherein
the retainer is fastened to the vicinity information detection sensor with a bolt, via an elastic member.

4. The installation structure for the vicinity information detection sensor according to claim 1, wherein
the vibration absorbing member is configured to damp vibration generated by the motor.

5. The installation structure according to claim 1, wherein the vicinity information detection sensor extends into a gap in the outer panel.

6. The installation structure according to claim 5, wherein the vicinity information detection sensor is exposed to an atmosphere external to the outer panel.

7. A vehicle comprising:
an outer panel; and
a sensor attached to an inner side of the outer panel, wherein the sensor is configured to radiate electromagnetic waves functioning as radar waves to detect vicinity information, the sensor comprises a motor configured to change a radiation direction of the electromagnetic waves, the sensor further comprises:
a first mirror, and the motor is configured to move the first mirror to change the radiation direction of the electromagnetic waves in a first direction,
a second motor, and
a second mirror, and the second motor is configured to rotate the second mirror to change the radiation direction of the electromagnetic waves in a second direction different from the first direction;
a vibration absorbing member between the outer panel and the sensor, wherein an entirety of the vibration absorbing member is spaced from the outer panel; and
a bolt configured to attach the sensor to the inner side of the outer panel, wherein a portion of the bolt is between the sensor and the outer panel in a first direction, wherein
the vibration absorbing member is between the outer panel and the sensor in a second direction perpendicular to the first direction.

8. The vehicle according to claim 7, further comprising a retainer, wherein the retainer is configured to fix the sensor to the outer panel.

9. The vehicle according to claim 8, wherein the vibration absorbing member is between the sensor and the retainer.

10. The vehicle according to claim 8, further comprising a bolt configured to fasten the sensor to the retainer.

11. The vehicle according to claim 7, wherein the retainer comprises an elastic engaging piece configured to engage with the outer panel.

12. The vehicle according to claim 7, wherein the vibration absorbing member is configured to dampen vibrations generated by the motor.

13. A vehicle comprising:
an outer panel; and
a sensor attached to an inner side of the outer panel, wherein the sensor is configured to radiate electromagnetic waves functioning as radar waves to detect vicinity information, the sensor comprises a motor configured to change a radiation direction of the electromagnetic waves, the sensor further comprises:
a first mirror, and the motor is configured to move the first mirror to change the radiation direction of the electromagnetic waves in a first direction,
a second motor, and
a second mirror, and the second motor is configured to rotate the second mirror to change the radiation direction of the electromagnetic waves in a second direction different from the first direction;
a vibration absorbing member between the outer panel and the sensor, wherein an entirety of the vibration absorbing member is spaced from the outer panel; and
a retainer, wherein the retainer is configured to fix the sensor to the outer panel, wherein the outer panel comprises a first resin material having a first coefficient of thermal expansion, and the retainer comprises a second resin material having the first coefficient of thermal expansion.

* * * * *